(12) United States Patent
Rishe

(10) Patent No.: US 9,734,161 B2
(45) Date of Patent: Aug. 15, 2017

(54) STREAMING REPRESENTATION OF MOVING OBJECTS AND SHAPES IN A GEOGRAPHIC INFORMATION SERVICE

(71) Applicant: Naphtali David Rishe, Miami Beach, FL (US)

(72) Inventor: Naphtali David Rishe, Miami Beach, FL (US)

(73) Assignee: The Florida International University Board of Trustees, Miami, FL (US)

( * ) Notice: Subject to any disclaimer, the term of this patent is extended or adjusted under 35 U.S.C. 154(b) by 311 days.

(21) Appl. No.: 14/215,484

(22) Filed: Mar. 17, 2014

(65) Prior Publication Data

US 2014/0280319 A1 Sep. 18, 2014

Related U.S. Application Data

(60) Provisional application No. 61/792,985, filed on Mar. 15, 2013.

(51) Int. Cl.
*G06F 17/30* (2006.01)
*G06F 3/0481* (2013.01)

(52) U.S. Cl.
CPC ...... *G06F 17/30241* (2013.01); *G06F 3/0481* (2013.01)

(58) Field of Classification Search
None
See application file for complete search history.

(56) References Cited

U.S. PATENT DOCUMENTS

| | | | | |
|---|---|---|---|---|
| 7,016,781 B1* | 3/2006 | Wolfson | ............. | G01C 21/3415 707/999.003 |
| 2008/0309518 A1* | 12/2008 | Aung | ................... | G01C 23/005 340/979 |
| 2009/0160939 A1* | 6/2009 | Fernandez | ....... | G08B 13/19608 348/158 |
| 2011/0137629 A1* | 6/2011 | Tipping | ................ | G01C 21/00 703/2 |
| 2012/0089920 A1* | 4/2012 | Eick | ........................ | G08G 1/20 715/739 |
| 2012/0197911 A1* | 8/2012 | Banka | ............... | G06F 17/30864 707/752 |

(Continued)

OTHER PUBLICATIONS

Davis-Chu, Debra Lee et al., "The Creation of a System for 3D Satellite and Terrain Imagery," *13th International Conference on Applied Geologic Remote Sensing*, Vancouver, British Columbia, Canada, Mar. 1-3, 1999, p. II-329-II-336.

(Continued)

*Primary Examiner* — Pierre Vital
*Assistant Examiner* — Alicia Antoine
(74) *Attorney, Agent, or Firm* — Saliwanchik, Lloyd & Eisenschenk

(57) ABSTRACT

A geographical information system (GIS) is described that enables querying, analysis and visualization of real-time streaming data pertaining to at least one moving object or entity (e.g., vehicles, people, sensors, weather phenomena, etc.) in conjunction with relatively static multi-temporal geospatial data. An application programming interface is provided to present the GIS functionality for handling dynamically moving objects or entities to clients.

6 Claims, 2 Drawing Sheets

(56) References Cited

U.S. PATENT DOCUMENTS

| | | | |
|---|---|---|---|
| 2013/0063300 A1* | 3/2013 | O'Regan | E02B 15/00 342/357.25 |
| 2013/0063489 A1* | 3/2013 | Hourie | G06F 17/30241 345/643 |
| 2013/0110392 A1* | 5/2013 | Kosseifi | G01C 21/3415 701/410 |
| 2013/0339891 A1* | 12/2013 | Blumenberg | G06F 17/3087 715/771 |

OTHER PUBLICATIONS

Prabhakaran, Nagarajan et al., "A Two Phase Digital Ortho Photo Mosaicking System," *International Conference on Imaging Science, Systems, and Technology (CISST '99)*, Jun. 28-Jul. 1, 1999, Las Vegas, Nevada, p. 151-154.
Rishe, Naphtali et al., "Semantic Database Engine Design," *Proceedings of the Seventh International Conference on Enterprise Information Systems*, Miami, USA, May 25-28, 2005, p. 433-436.
Rishe, Naphtali et al., "Storage Types in the Semantic Binary Database Engine," *Proceedings of the Seventh International Conference on Enterprise Information Systems*, Miami, USA, May 25-28, 2005, p. 437-440.
Rishe, Naphtali et al., "XML-Based Semantic Database Definition Language," *Proceedings of the Seventh International Conference on Enterprise Information Systems*, Miami, USA, May 25-28, 2005, p. 197-202.
Cao, Hu et al., "Spatio-Temporal Data Reduction with Deterministic Error Bounds", DIALM-POM, 2003, 1-10.
Cao, Guohong et al., "A Delay-Optimal Quorum-Based Mutual Exclusion Scheme with Fault-Tolerance Capability," *The 18th International Conference on Distributed Computing Systems*, 1998, 444-451.
Cary, Ariel et al., "Efficient and Scalable Method for Processing Top-k Spatial Boolean Queries," *Proceedings of the 22nd International Conference on Scientific and Statistical Database Management*, 200, 87-95.
Cary, Ariel et al., "Experiences on Processing Spatial Data with MapReduce," *SSDBM*, 2010.
Cary, Ariel et al., "Leveraging Cloud Computing in Geodatabase Management," *IEEE International Conference on Granular Computing*, 2010, 73-78.
Chen, Shu-Ching et al., "A User-Friendly Multimedia System for Querying and Visualizing of Geographic Data," *The 4th World Multiconference on Systemics, Cybernetics and Informatics*, 2000, 2:689-694.
Chen, Chung-min et al., Batch Processing in Computers, "*Encyclopedia of Electrical and Electronic Engineering*", 1999, 2:223-233.
Davis-Chu, Debra et al., "A System for Continuous Real-Time Search and Retrieval of Georeferenced Objects," *Proceedings of the ISCA 2nd International Conference on Information Reuse and Integration*, 2000, 82-85.
Ege, Raimund et al., "Using Java to add 'Stored Procedures' to Databases," *TOOLS '99 Conference*, 1999, 322-331.
Ehlmann, Bryon et al., "Specifying and Enforcing Association Semantics via ORN in the Presence of Association Cycles," *IEEE Transactions on Knowledge and Data Engineering*, 2003, 15(1)1-9.
Gutierrez, M, et al., "Applying TerraFly for Vulnerability Assessment of Mobile Home Communities," *Seventh International Conference on Remote Sensing for Marine and Coastal Environments*, 2002, 6.1-6.6.
Li, Tao. "A Unified View on Clustering Binary Data," *Florida International University School of Computer Science*, 2006, 62(3):199-215.
Ling, Yibei et al., "A Hybrid Estimator for Selectivity Estimation," *IEEE Transactions on Knowledge and Data Engineering*, 1999, 11(2):Abstract.
Ilari, Sergio et al., "Processing of Data Streams with Prediction Functions," *Proceedings of Hawaii International Conference on System Sciences*, 2006, 1-10.
Lucic, Tajana et al., "Doctordigest: A System for Classification of Medical Internet Resources and Reviews," *Proceedings of the 2001 International Conference on Software, Telecommunications and Computer Networks*, 2001, 2:981-988.
Meng, Weiyi et al., "Determining Text Databases to Search in the Internet," *Proceedings of the 24th Very Large Databases*, 1998, 14-25.
Meng, Weiyi et al., "Estimating the Usefulness of Search Engines," *Proceedings of the 1999 International Conference on Data Engineering*, 1999, 146-153.
Meng, Weiyi et al., "Performance Analysis of Three Text-Join Algorithms," *IEEE Transactions on Knowledge and Data Engineering*, 1998, 10(3):477-492.
Rishe, Nahtali et al., "High Performance Lempel-Ziv Compression Using Optimized Longest String Parsing and Adaptive Huffman Window Size," *IEEE Data Compression Conference*, 2000, 568.
Rishe, Naphtali et al., "Geospatial Data Management with TerraFly," *Handbook of Data Intensive Computing*, 2011, 25:637-665.
Rishe, Naphtali et al., "Object ID Distribution and Encoding in the Semantic Binary Engine," *Proceedings of the Seventh International Conference on Enterprise Information Systems*, 2005, 279-284.
Rishe, Naphtali et al., "Semantic Access: Semantic Interface for Querying Databases," *Proceedings of the 26th International Conference on Very Large Databases*, 2000, 591-594.
Rishe, Naphtali et al., "Terrafly: A High-Performance Web-Based Digital Library System for Spatial Data Access," *International Conference on Data Engineering*, 2001, 17-19.
Rishe, Naphtali et al., "An Efficient Web-based Semantic SQL Query Generator," *The 19th IEEE International Conference on Distributed Computing Systems Workshop*, 1999, Abstract.
Rishe, Naphtali et al., "On Database Integration over Intelligent Networks," *Proceedings of the LSCA 2nd International Conference on Information Reuse and Integration*, 2000, 70-75.
Rishe, Naphtali et al., "Report Generator," *Encyclopedia of Electrical and Electronics Engineering*, 1999, 18:500-513.
Rishe, Naphtali et al., "Research Initiatives," *Encyclopedia of Electrical and Electronics Engineering*, 1999, 18:514-520.
Selivonenko, Andriy et al., "Dynamic Mosaicking of Heterogeneous Digital Images," *International Conference on Information Reuse and Integration*, 2000, 86-90.
Szczurek, Piotr et al., "Learning the Relevance of Parking Information in VANETs," *The Seventh ACM International Workshop on Vehicular Inter-NETworking*, 2010, 81-82.
Trajceveski, Goce et al., "Managing Uncertain Trajectories of Moving Objects with DOMINO", *Proceedings of the 4th Inernational Conference on Enterprise Information Systems*, 2002, 217-224.
Wang, Fei et al., "Community Discovery Using Nonnegative Matrix Factorization," *Data Mining and Knowledge Discovery*, 2011, 22(3):493-521.
Wolfson, Ouri et al., "Database Integration over Hybrid Networks," *Proceedings of the 2011 International Conference on Software, Telecommunications, and Computer Networks*, 2002, 2:935-942.
Wolfson, Ouri et al., "Databases for Tracking Mobile Units in Real time," *Proceedings of the Seventh International Conference on Databases Theory (ICDT)*, 1999, 169-186.
Wolfson, Ouri et al., "Management of Dynamic Location Information in DOMINO," *Proceedings of the International Conference of Extending Database Technology*, 2002, 769-771.
Wolfson, Ouri et al., "Resource Discovery Using Spatio-Temporal Information in Mobile Ad-Hoc Networks," *Proceedings of the 5th International Workshop on Web and Wireless Geographical Information Systems*, 2005, 129-142.
Wolfson, Ouri et al., "Updating and Querying Databases that Track Mobile Units,"*Invited Paper, special issue of the Distributed and Parallel Databases Journal (DAPD) on Mobile Data Management and Applications*, 1999, 7(3):257-288.
Xu, Bo et al., "Benefit and Pricing of Spatio-temporal Information in Mobile Perr-to-Peer Networks," *Proceedings of Hawaii International Conference on System Sciences*, 2006, 1-10.

(56) References Cited

OTHER PUBLICATIONS

Xu, Bo et al., "Spatially Distributed Databases on Sensors," *Proceedings of the 8th ACM Symposium on Advances in Geographic Information Systems*, 2000, 153-160.
Yu, Clement et al., "Efficient and Effective Metasearch for a Large Number of Text Databases," *Proceedings of the Eighth International Conference on Information and Knowledge Management*, 1999, 217-224.
Yu, Clement et al., "Finding the Most Similar Documents Across Multiple Text Databases," *Proceedings of the IEEE Conference of Advances in Digital Libraries*, 1999, 150-162.

* cited by examiner

STREAMING REPRESENTATION OF MOVING OBJECTS AND SHAPES IN A GEOGRAPHIC INFORMATION SERVICE

CROSS REFERENCE TO RELATED APPLICATION

The present application claims the benefit of U.S. Provisional Application Ser. No. 61/792,985, filed Mar. 15, 2013, which is hereby incorporated by reference herein in its entirety, including any figures, tables, or drawings.

GOVERNMENT SUPPORT

This invention was made with government support under Award Number HRD-0833093 awarded by the National Science Foundation. The government has certain rights in the invention.

BACKGROUND

A Geographic Information System (GIS) captures, stores, analyzes, manages, and presents data linked to geographic locations. Example GISs include Google Earth™, ArcGIS® from ESRI, and commercial fleet management services.

In general, a GIS presents tools for users to query and make decisions based on geographic information. The geographic information may be spatial and temporal; and is often heterogeneous, from divergent sources, and may contain structured and unstructured data. As a result, the processing of this data becomes complex and involves numerous challenges. For example, the use of multiple, disparate tools are often necessary in order to process and analyze geospatial data in real-time. These tools are often expensive and can require specialized skills and training to use. In addition, each tool may require the data to be in different formats, increasing the difficulty in combining heterogeneous types of data.

Another challenge associated with current commercial systems is that much of the information currently stored in these systems is either historical or static in nature. While this is acceptable for visualizing data such as road-maps, and even handling a single moving object, such as in global positioning system (GPS) navigation where a moving vehicle is the only dynamic object represented, there exists a gap in presenting and handling the dynamic information associated with moving objects in the surrounding environment having different locations, speeds, shapes and trajectories.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain embodiments provide a GIS system that leverages video streaming sensor nodes and presents the dynamic information associated with moving objects in a manner that can be used across a variety of clients. In addition, techniques are discussed for minimizing bandwidth issues.

An application programming interface (API) is provided in which clients may access and use dynamic information associated with moving objects in a surrounding environment.

DETAILED DISCLOSURE

An application programming interface (API) for a Geographic Information System (GIS) is disclosed. The API enables clients to perform visual querying and rendering.

Querying, analysis, and visualization of real-time data pertaining to at least two moving objects in conjunction with relatively static multi-temporal geospatial data can be facilitated on client devices through the presentation of the API.

A GIS server, that may provide a GIS service including the API, can incorporate data from mobile video sensors and streaming technologies in order to present streaming and/or video data.

In certain embodiments, the GIS server can perform the step of processing and analyzing geographic, spatial and/or temporal data to provide visual representation of the trajectories of relevant objects, which may be known to the server in advance or transmitted in real time, sampled, and have uncertainty aspects.

Geographic data exploration can be enhanced through incorporation of moving objects. For example, at the client, moving objects of a specific area of interest may be viewed overlaid on geospatial data. According to embodiments of the invention, dynamic movement of objects within the geographic area and at specific resolutions of interest can be presented. This translates to the user as a real-world experience with objects moving across their screen or "zooming" by them.

User scenarios that may be supported include, but are not limited to: (1) the user is on board a moving object whose trajectory (e.g., location as a function of time) is known a priori to the server; (2) the user is on board a moving object whose trajectory is generated in real-time and received by the server; or (3) the user is located at a fixed point.

Likewise, the trajectories of relevant objects may be known to the server in advance or received by the server in real time and sampled. Visual querying and rendering can be provided to the client.

Figure 1:
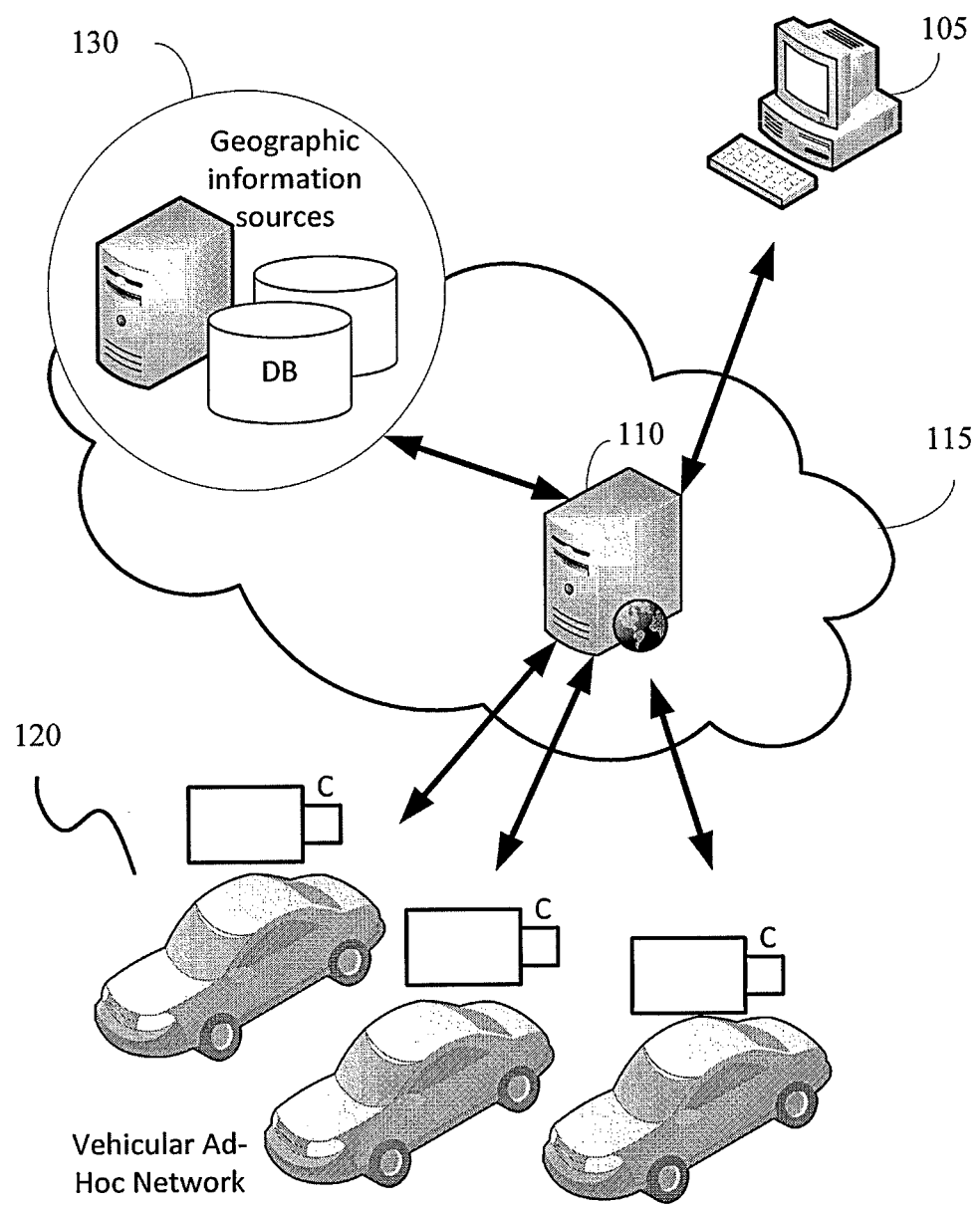
FIG. 1 shows an operating environment in which an embodiment of the invention may be implemented.

FIG. 1 shows an operating environment in which an embodiment of the invention may be implemented. Referring to FIG. 1, a client device 105 can communicate with a GIS server 110 over a network 115.

The network 115 can include, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 115 may include one or more connected networks (e.g., a multi-network environment) including public networks, such as the Internet, and/or private networks such as a secure enterprise private network. Access to the network 115 may be provided via one or more wired or wireless access networks as will be understood by those skilled in the art.

The client device 105 may be, but is not limited to, a personal computer (e.g. desktop computer), laptop, personal digital assistant (PDA), mobile phone (or smart phone), tablet, slate, terminal, or set-top box.

The GIS server 110 may include distributed servers that execute real-time continuous queries to facilitate rendering and collaborating with vehicular ad-hoc networks (VANets) 120 and other video streaming sources. For example, a mobile sensor (e.g., on a drone aircraft or even a smart phone) with geo-positioning and communication capabilities and a camera can capture vehicles and pedestrians that are in line of sight and/or a stationary sensor with communication capabilities and a camera can be installed at geographically distributed locations such as at a traffic light, and these videos and/or images be communicated over a network, and ultimately collected by the GIS server 110.

The GIS server 110 may include one or more computing devices. For example, the GIS server 110 can include one or more blade server devices, standalone server devices, personal computers, routers, hubs, switches, bridges, firewall devices, intrusion detection devices, mainframe computers, network-attached storage devices, and other types of computing devices.

In embodiments where the GIS server 110 includes multiple computing devices, the server can include one or more communications networks that facilitate communication among the computing devices.

For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office. Certain embodiments of the invention can be practiced in distributed-computing environments where tasks are performed by remote-processing devices that are linked through a communications network. In a distributed-computing environment, program modules can be located in both local and remote computer-readable storage media.

The GIS server 110 can also access multiple geographic information sources 130 for static and/or dynamic geographic information. Once the results from the information sources are received by the GIS server 110, the GIS server can perform steps of filtering and formatting the results; storing the results in a database, transforming the results into a visual representation, and/or transmitting the results in a form to client devices.

The client device 105 can communicate with the GIS server 110 to obtain visual data and information on relevant moving objects based on criteria submitted by a user of the client device 105.

To allow ergonomic formulation of queries, a user interface can be provided in a web browser of the client device 105 in which the end-user will be provided the ability to graphically manipulate objects and navigation examples. The presented data about the object can include the object's existing and computed properties, including location, description, context, and personalization. This query pattern adds information retrieval and database selection-like constraints to traditional spatio-temporal queries. Such constraints give users the flexibility to execute free-text searches (information-retrieval style) on unstructured data, or refined attribute-based predicate retrieval (SQL style) on structured data. For example: "visualize the trajectories of large green trucks near the current point" is a query where "green" is a keyword, "truck" is a category, and "large" translates into a numerical predicate.

Certain embodiments provide support for requests to the GIS server 110 from the client that include functions for opening historic movement trajectories, getting live movement trajectories from the server, getting a video player (or a view of a player) to play videos captured on a given trajectory, and getting movement trajectory inside a search window that a user is interested in.

An API method for performing these functions is disclosed. The GIS services API involves a set of request messages available to a client 105 (or server) along with a definition of the structure of response messages sent to the client (or server). The response messages from the GIS 110 server to the client 105 may be in a markup language such as Extensible Markup Language (XML) or JavaScript Object Notation (JSON). The GIS services provided by GIS server 110 can interact programmatically over the network through industry standard Web protocols, such as, but not limited to, XML, JSON, Hypertext Transfer Protocol (HTTP) Representational State Transfer (REST), and Simple Object Access Protocol (SOAP).

According to certain embodiments of the invention, API functions that may be called by the client 150 include:
"getHistoricTraces": to get all the historic movement trajectories from server;
"getLiveTraces": to get all the live movement trajectories from server;
"openPlayer": to ask server to open a player to play the videos captured on the given trajectory; and
"openSearchWindowWithPolygon": to get the movement trajectory inside a search window.

The search window is described by a series of points in latitudes and longitudes bounding the area that the user is interested in.

Figure 2:
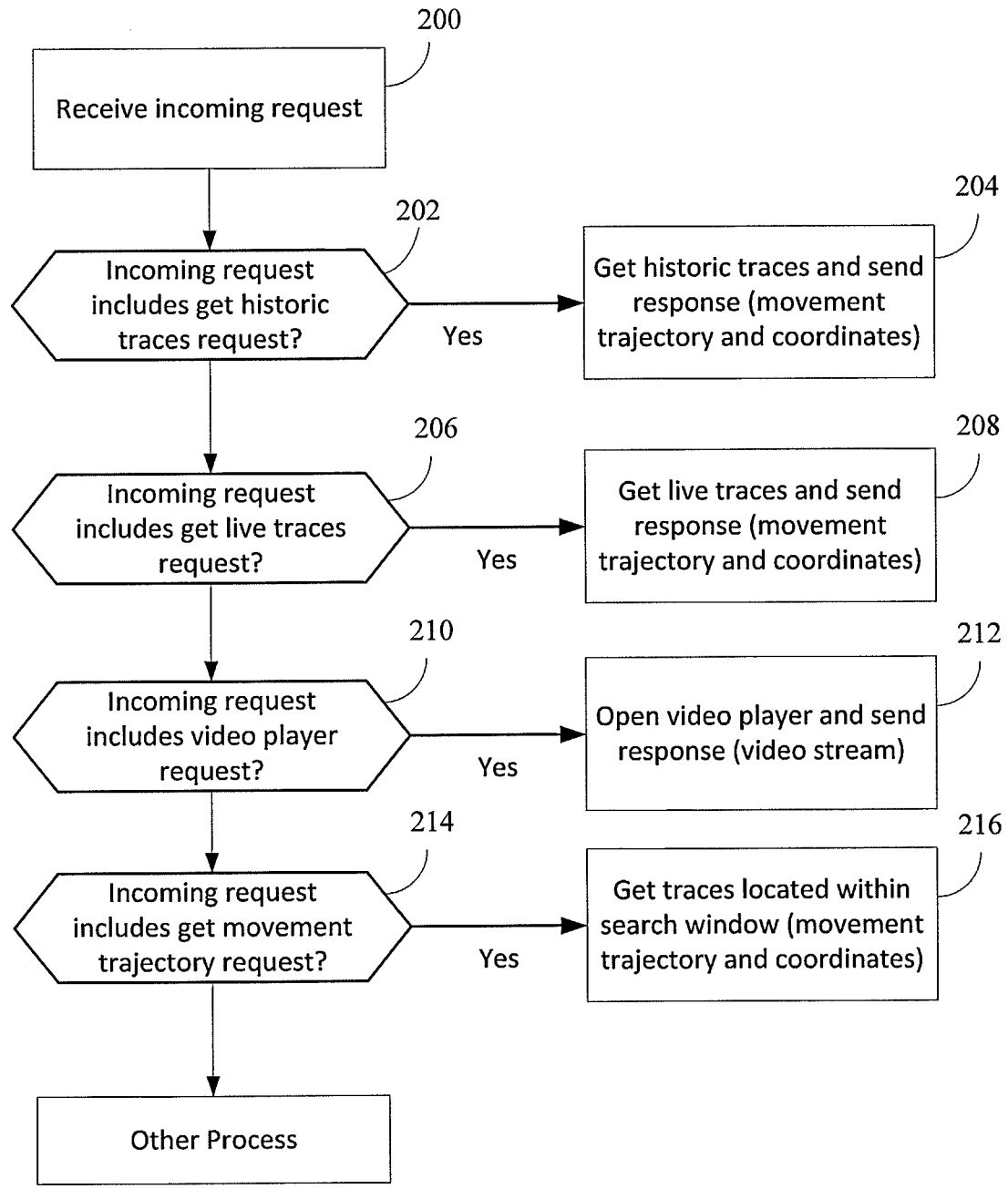
FIG. 2 is a flowchart illustrating an example operation performed by a GIS server according to an embodiment of the invention.

FIG. 2 is a flowchart illustrating an example operation performed by a GIS server according to an embodiment of the invention. An incoming message from the client may be received by an API server of the GIS server. The incoming message may be received as a SOAP protocol message.

When the API/GIS server receives the incoming message, the API/GIS server determines whether the incoming message includes a historic traces request "getHistoricTraces" (202). If the incoming message includes the historic traces request ("Yes" of 204), the API/GIS server may get some or all historic traces and sends response back to client (204). The server may get this information from a database.

The API/GIS server also determines whether the incoming message includes a live traces request "getLiveTraces" (206). If the incoming message includes the live traces request ("Yes" of 206), the API/GIS server may get some or all live traces and sends response back to client (208). The server may get this information from at least one sensor having a camera.

The API/GIS server also determines whether the incoming message includes a video player request "openPlayer" (210). If the incoming message includes the open player request ("Yes" of 210), the API/GIS server may open the video player in the portal (e.g., user interface of client browser) and may stream video to client (212).

The API/GIS server also determines whether the incoming message includes a get movement trajectory request "openSearchWindowWithPolygon" (214). If the incoming message includes the get movement trajectory request ("Yes" of 214), the API/GIS server may get the traces located within the search window back to client (216). Information about the specific trajectory may be obtained from at least one sensor having a camera within a geographic region associated with the search window or from information associated with the search window that is stored in a database.

An example of a SOAP request for "getHistoricTraces" is as follows:

```
<SOAP-ENV:Envelope xmlns:SOAP-ENV="..." xmlns:SOAP-ENC="..."
xmlns:xsi="..." xmlns:xsd="..."> <SOAP-ENV:Body>m:getHistoricTraces x
lns:m="http://map_proxy.gis.cms.ibm.com/"/> </SOAP-ENV:Body> </SOAP-ENV:Envelope>
```

An example of a SOAP request for "openPlayer", which shows an argument for a streaming video channel, is as follows:

```
<SOAP-ENV:Envelope xmlns:SOAP-ENV= "..." xmlns:SOAP-ENC="..." xmlns:xsi="..."
xmlns:xsd="..."> <SOAP-ENV:Body> <m:openPlayer
xmlns:m="http://map_proxy.gis.cms.ibm.com/"> <arg0> Channel Live2
</arg0></m:openPlayer></SOAP-ENV:Body></SOAP-ENV:Envelope>
```

A user interface can be provided in which a map is displayed as part of a geographical visualization view of a region. When a user selects an object (such as one of the moving objects) displayed in the geographical visualization view in order to see its video, the user interface can request the video from the GIS server using, for example, the openPlayer request. Once the client receives the streaming video captured by the sensor corresponding to the selected object, the user interface can present a video player in the portal to show the video stream. While watching the video stream, the user can interact with the video player, resulting in changes to the geographical visualization view of the region. For example, the user may manually shift a time pointer in the video stream being watched in the player. In response to receiving this input, the interface can reposition the moving object on the map. In some embodiments, a polygonal projection of the sensor's view to earth surface can be provided as part of the visualization and synchronized with the playback of the video player.

In some implementations, the client can request "getHistoricTraces" and "getLiveTraces" at regular intervals, for example, every second. For each request, the server may return an XML formatted file that contains the name of the movement trajectories and the coordinates of the points of the trajectories. The client may draw these trajectories on the map within a user interface and list them in a Trajectory Control panel provided to the client. In one implementation, related streaming videos that lie on the trajectory path can be displayed in response to receiving an input command, such as a right click by a mouse connected to the client device or by a touch or other gesture of a touchscreen of the client device, on the trajectory path itself. A pop-up window can be displayed with the option of "Open Player" that, if selected, would proceed to send a request for the streaming video to the server and open a window to view that video.

In some implementations, trajectory paths may be drawn in a manner to minimize unnecessarily obscuring other elements on the screen, for example as a thin red line. This, however, can make it more difficult for users to be able to select the trajectory path itself. To mitigate this and help users to select on the trajectory paths, an invisible buffer can be placed around the trajectory path lines that when an input indicating a selection is received on the invisible buffer, it is understood to be a selection of the trajectory path itself. Thus, the trajectory paths can be displayed with minimal disruption to the geographic visualization while still maintaining the ability to select the line for a second action. The user interface can include markers to tag the movement trajectories on the map in case the trajectories are too small to be seen from global view. The Trajectory Path Control panel can list available movement trajectories returned from the server in response to one of the requests for getting trajectories. When a trajectory is selected in the Trajectory Path Control panel, the view of the trajectory path from the perspective of an object along the trajectory path can be provided (e.g., representing a scenario where a user is on board the moving object).

In certain embodiments, client-server bandwidth can be optimized. In one embodiment, the client can periodically consult the server for moving objects instead of using a constant stream of data. The rate of checking for moving objects and the number of moving objects will influence the bandwidth required. Algorithms that deal with time- and speed-based stream predictions and collision detection can be used to minimize the number of checks to the server and the number of objects consulted. To optimize client-server bandwidth, objects that are moving slowly in the viewable window (indicating that they are far away), can be checked for updates less often. Objects that are close or moving at a fast pace are checked more frequently. Also, objects that are not travelling on a collision course with the client's viewable window can be ignored altogether. Of course, if a change of direction is detected, the collision course can be re-evaluated.

In certain embodiments, the future location of a moving object is predicted for obtaining visual results of moving objects (positions) to optimize client-server bandwidth. Location prediction refers to statistical methods that derive patterns or mathematical formulas whose purpose is, given the recent trajectory of a moving object, to predict its future location. In one related embodiment, sensor data streams are queried, wherein each update from a sensor is associated with a function allowing prediction of future values of that sensor. The sensor commits to update its value whenever the difference between the observed value and the value estimated using the prediction function exceeds a certain threshold. Location prediction enables selective transfer of moving objects' data from the server to the client. More specifically, moving objects whose locations are predicted to be viewable will be transferred, whereas other moving objects' data will not, to optimize client-server bandwidth.

The subject systems and methods can be used in a wide variety of applications and settings including, but not limited to, weather monitoring, troop dispatching, endangered species tracking, disaster mitigation, general aviation monitoring, fleet management, transportation and highway patrol problems, traffic analysis and visualization, commanding and controlling mobile sensors; commanding and controlling operations (e.g., homeland security, law enforcement and disaster response).

In one embodiment, the system and method of the invention enables situational monitoring by law enforcement (e.g., notice is provided to law enforcement regarding a hit and run accident). In a specific embodiment, video surveillance recordings, which are used in specific locations, are accessed in real time and integrated with other forms of critical information (e.g., airborne and vehicle-borne sensors). By way of example, law enforcement officers would be able to use the invention to quickly pin point the geographic location, view streaming media of the current location to quickly assess the situation, and, through the use of additional sensors, track the offender's vehicle.

Certain techniques set forth herein may be described or implemented in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the mechanisms by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Communication media, particularly carrier waves and other propagating signals that may contain data usable by a computer system, are not included as computer-readable storage media.

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" do not consist of carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A system comprising:
   a geographical information system (GIS) server accessing a geographic information source for static or dynamic geographic information and providing a visual representation of a trajectory of a relevant object;
   a computer system in conjunction with the GIS server and comprising a display;
   at least one first sensor within a first geographic region;
   at least one second sensor capturing information;
   a database storing historical information; and
   one or more non-transitory machine readable media having instructions stored thereon that, when executed by a computing device of the computer system, direct the computer system to perform a method comprising:
   in response to receiving a real-time information request, getting information from the at least one second sensor capturing information related to an object indicated by the real-time information request;
   in response to receiving a historical trajectory request, getting historical information pertaining to an object indicated by the historical trajectory request from the database;
   in response to receiving a search window trajectory request, getting information about one or more moving objects within a search window from the at least one first sensor within the first geographic region associated with the search window, from information associated with the search window that is stored in the database, or from both the at least first one sensor within the first geographic region associated with the search window and the information associated with the search window that is stored in the database, and providing to the display a visual representation of a trajectory of the object indicated by the historical trajectory request, thereby displaying on the display a geographical visualization of the trajectory of the object to a user of the one or more non-transitory machine readable media; and performing time and speed-based predictions of at least one object's collision with a geographical region represented by a viewable window of the display for a client and using real-time sensor data, historical information, or both, to determine a rate of updating and which of the objects to update for the client receiving periodic updates of object trajectories in the viewable window, the system being configured such that:

the visual representation of the trajectory of the object provided to the display comprises trajectory paths;

an invisible buffer is placed around the trajectory paths such that, when an input from the user indicating a selection is received on the invisible buffer, it is interpreted by the system to be a selection of the trajectory paths;

the real-time information request, the historical trajectory request, and the search window trajectory request comprise a query pattern that comprises information retrieval and database selection constraints;

the object indicated by the real-time information request is the same as the object indicated by the historical trajectory request;

objects determined by the system to be moving at a slower speed in the viewable window are checked for updates less often than objects determined to be moving at a faster speed in the viewable window;

objects determined to not be on a collision course with the viewable window are excluded from polling data and computation of content of the viewing window;

the at least one second sensor capturing information related to the object indicated by the real-time information request comprises a second sensor located on the object indicated by the real-time information request; and the at least one first sensor within the first geographic region associated with the search window comprises a first sensor located on at least one of the one or more moving objects.

2. The system of claim 1, wherein the at least one second sensor capturing information related to the object indicated by the real-time information request comprises a camera.

3. The system of claim 2, wherein the at least one first sensor within the first geographic region associated with the search window comprises a camera.

4. The system of claim 1, wherein the at least one first sensor within the first geographic region associated with the search window comprises a camera.

5. The system of claim 1, wherein, in response to receiving the real-time information request, the computer system is further directed to return a response comprising a stream of coordinates of points representing a real-time moving-object-trajectory.

6. The system of claim 1, wherein, in response to receiving the historical trajectory request, the computer system is further directed to return a response comprising coordinates of points of the trajectory of the object indicated by the historical trajectory request.

* * * * *

UNITED STATES PATENT AND TRADEMARK OFFICE
CERTIFICATE OF CORRECTION

| | |
|---|---|
| PATENT NO. | : 9,734,161 B2 |
| APPLICATION NO. | : 14/215484 |
| DATED | : August 15, 2017 |
| INVENTOR(S) | : Naphtali David Rishe |

It is certified that error appears in the above-identified patent and that said Letters Patent is hereby corrected as shown below:

In the Specification

Column 1, Lines 15-18:
"This invention was made with government support under Award Number HRD-0833093 awarded by the National Science Foundation. The government has certain rights in the invention."

Should read:
--This invention was made with government support under HRD0833093 awarded by the National Science Foundation. The government has certain rights in the invention.--

Signed and Sealed this
Twenty-eighth Day of February, 2023

Katherine Kelly Vidal
*Director of the United States Patent and Trademark Office*